Oct. 12, 1937.  L. G. S. BROOKER  2,095,855
PHOTOGRAPHIC EMULSION CONTAINING PYRIDOCYANINES
Filed March 6, 1933

Fig.1. 1,1'-Dimethyl-2,2'-pyridocyanine iodide.
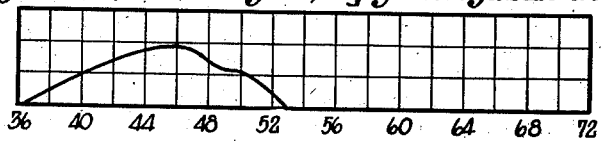

Fig.2. 4,1'-Dimethyl-3-ethylthiazolo-2'-pyridocyanine iodide.
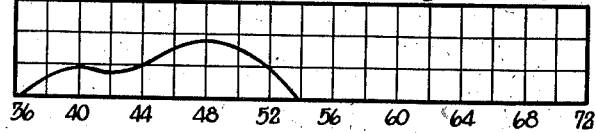

Fig.3. 4,1'-Dimethyl-3-ethylthiazolo-2'-pyridocyanine iodide.
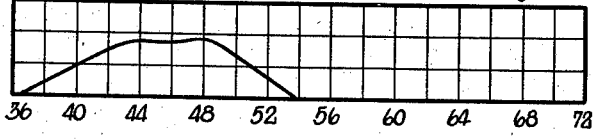

Fig.4. 3,4,1'-Trimethylselenazolo-2'-pyridocyanine iodide.
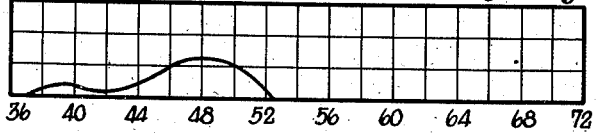

Fig.5. 3,4,1'-Trimethylselenazolo-2'-pyridocyanine iodide.
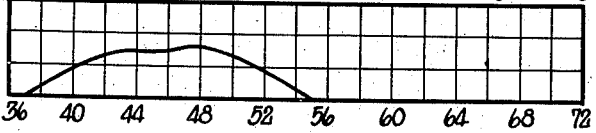

Fig.6. 3,1'-Dimethylthiazolino-2'-pyridocyanine iodide.
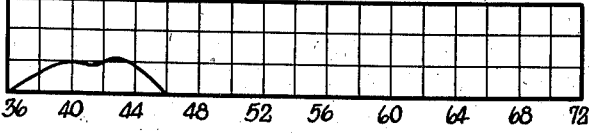

Inventor:
Leslie G. S. Brooker,
Daniel J. Mayne
By
Attorneys.

Patented Oct. 12, 1937

2,095,855

UNITED STATES PATENT OFFICE 2,095,855

PHOTOGRAPHIC EMULSION CONTAINING PYRIDOCYANINES

Leslie G. S. Brooker, Rochester, N. Y., assignor, by mesne assignments, to Eastman Kodak Company, Jersey City, N. J., a corporation of New Jersey Application March 6, 1933, Serial No. 659,630

6 Claims. (Cl. 95—7)

This invention relates to new compositions of matter and particularly to a new class of photographic sensitizing dyes, known as pyridocyanines, a method for their preparation and photographic emulsions containing them.

Various cyanine dyes containing the pyridine nucleus have been described. The pyridocarbocyanines have been investigated by Rosenhauer and Barlet (Ber., 1929, 62, 2724), a thio-2'-pyridocyanine was made by Mills & Braunholtz (J. C. S. 1923, 123, 2804) and more recently, some ψ-cyanine dyes containing a pyridine nucleus were described by Hamer & Kelly (J. C. S. 1931, 777).

In my co-pending application No. 651,870 it is shown that the cyanine dye of the general formula

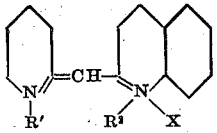

where R' and R² equal similar or dissimilar alkyl and X equals an acidic radical (these symbols are utilized throughout this application) can be prepared from a 2-methyl pyridine alkyl quaternary salt and 2-iodoquinoline alkyl iodide, providing that a strong organic base is used for the condensation rather than the potassium hydroxide previously used. (Hamer & Kelly, loc. cit.)

The preparation of a cyanine dye of what may be called the 2'-pyridocyanine type, in which the second heterocyclic nucleus is a one ring nucleus, have not been described heretofore in the literature. Using the method described in my aforementioned copending application No. 651,870 such dyes are now readily accessible for the first time and form the subject of the instant application.

For instance, in the preparation of a 2,2'-pyridocyanine, of the following general formula

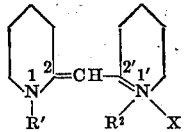

1,1'-dialkyl-2,2'-pyridocyanine salt the starting materials are a 2-methylpyridine alkyl quaternary salt and a 2-iodopyridine alkyl iodide, and these compounds may be condensed together in absolute ethyl alcoholic solution using a strong base, such as triethylamine, to effect the condensation.

Similarly, dyes of the following general formula may be prepared—

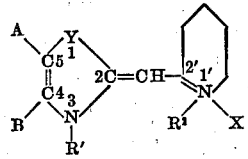

3,1'-dialkyl thi azolo-2'-pyridocyanine salt
or selen where A and B are monovalent atoms or groups, such as hydrogen, methyl or phenyl and Y represents oxygen, sulfur or selenium. In this case, the appropriate alkyl quaternary salt is one of a 2-methyloxazole, -thiazole or -selenazole, respectively, this being condensed with a 2-iodopyridine alkyliodide, a strong organic base being used as the condensing agent.

Dyes containing a thiazoline nucleus have been described in my co-pending application No. 460,548. Dyes of what may logically be called the thiazolino-2'-pyridocyanine series of the general formula

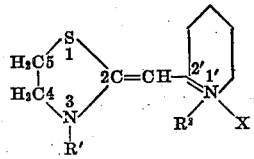

3,1'-dialkylthiazolino-2'-pyridocyanine iodide may be prepared by the use of alkyl quaternary salts of 2-methylthiazolines and 2-iodopyridine alkyl iodide, and employing a strong base to effect the condensation.

The following examples will illustrate in detail the method of preparing these dyes—

Example 1

*1,1'-Dimethyl-2,2'-pyridocyanine iodide*

2.4 parts (1 mol.) of α-picoline methiodide, 3.5 parts (1 mol.) of 2-iodopyridine methiodide, 16 parts of absolute ethyl alcohol and 2.1 parts (2.1 mols) of triethylamine are refluxed together. The dye begins to separate in glittering crystals from the boiling reaction mixture after 3 or 4 minutes, and refluxing is continued for 20 minutes. The dye is removed and is purified by washing with acetone followed by water, and is obtained in beautiful light brown platelets with a bright pale greenish reflex. It may be recrystallized from methyl alcohol when it is obtained in brown granular crystals with a green reflex. The color of the solution is golden-yellow.

Example 2

4,1'-Dimethyl-3-ethylthiazolo-2'-pyridocyanine iodide 2.7 parts (1 mol.) of 2,4-dimethylthiazole ethiodide, 3.5 parts (1 mol.) of 2-iodopyridine methiodide and 16 parts of absolute ethyl alcohol are brought to boiling, 2.1 parts (2.1 mols) of triethylamine added and the whole refluxed for 20 minutes. The dye rapidly separates from the boiling solution as a yellow-orange powder. It is removed, washed with acetone followed by water and may then be recrystallized from methyl alcohol in which it gives a yellow-orange solution. It separates as yellow needles or as orange needles with a bright greenish-yellow reflex, or as a mixture of the two forms.

Example 3

3,4,1'-Trimethylselenazolo-2'-pyridocyanine iodide 2.4-Dimethylselenazole metho-p-toluenesulfonate (1 mol.) is prepared by heating 1.5 parts (1 mol.) of 2,4-dimethylselenazole with 1.9 parts (1 mol.) of methyl p-toluenesulfonate for several hours at 100° C. The salt soon solidifies and is dissolved in 12 parts of hot absolute ethyl alcohol, 3.5 g. (1 mol.) of 2-iodopyridine methiodide added, the whole boiled, 2.1 parts (2.1 mols) of triethylamine added and refluxed for 20 minutes. The dye rapidly separates from the boiling solution. It is removed, washed with acetone followed by water and is obtained as a light-brown crystalline powder. It crystallizes from methyl alcohol, in which it gives a deep yellow-orange solution, in glittering minute brown crystals.

If an equivalent amount (1 mol.) of 2,4-dimethyloxazole be used in place of the 2,4-dimethylselenazole, then in the first stage of the synthesis, 2,4-dimethyloxazole metho-p-toluenesulfonate is formed, and in the final stage, 3,4,1'-trimethyloxazolo-2'-pyridocyanine iodide. This compound crystallizes in beautiful yellow needles.

Example 4

3,1'-Dimethylthiazolino-2'-pyridocyanine iodide 2 parts (1 mol.) of 2-methylthiazoline and 3.7 parts (1 mol.) of methyl p-toluenesulfonate are heated together at 100° for fifteen minutes to prepare 2-methylthiazoline metho p-toluenesulfonate (1 mol.). This salt, which readily sets to a solid mass, is heated under reflux with 12 parts of absolute ethyl alcohol, 6.9 parts (1 mol.) of 2-iodopyridine methiodide added, followed by 4.2 parts (2.1 mols) of triethylamine and the whole refluxed with shaking for fifteen minutes. On cooling, crystals separate out and are removed, washed with a little cold methyl alcohol and recrystallized from the same solvent. The dye may be given a further crystallization from water, using a little charcoal, if a little dark colored impurity is present. The dye is obtained in deep yellow needles m.p. 256–257° C. corr. and dissolves in methyl alcohol or in water giving a pale-yellow solution.

These dyes are useful as photographic sensitizers since they confer upon photographic emulsions, extra-sensitivity, in general, in the portions of the spectrum indicated in the attached spectrograms.

The diagrammatic spectrograms constituting the accompanying drawing illustrate the regions of the spectrum to which the various types of dyes herein disclosed will sensitize a gelatino-silver-halide emulsion and the extent of the sensitization at various wave lengths. The figures of this drawing and the dyes, the sensitizing properties of which they illustrate, are as follows—

Fig. 1, 1,1'-Dimethyl-2,2'-pyridocyanine iodide.
Fig. 2, 4,1'-Dimethyl-3-ethylthiazolo-2'-pyridocyanine iodide.
Fig. 3, 4,1'-Dimethyl-3-ethylthiazolo-2'-pyridocyanine iodide.
Fig. 4, 3,4,1'-Trimethylselenazolo-2'-pyridocyanine iodide.
Fig. 5, 3,4,1'-Trimethylselenazolo-2'-pyridocyanine iodide.
Fig. 6, 3,1'-Dimethylthiazolino-2'-pyridocyanine iodide.

Figs. 1, 3 and 5 are taken from bromide emulsions, while Figs. 2, 4 and 6 are taken from chloride emulsions.

The sensitization resulting from the various other dyes herein referred to, and belonging to the respective classes of dyes above illustrated, are all comparable to the sensitization illustrated as resulting from the specific dyes named in connection with these figures.

The preparation of gelatino-silver-halide emulsions is well known to those skilled in the photographic art. To sensitize such emulsions with the dyes herein described, I first prepare a stock solution of the dye by dissolving it in a suitable alcohol, such as methyl alcohol. Then into one liter of a flowable photographic gelatino-silver-halide emulsion I thoroughly incorporate an amount of the above stock solution (diluted somewhat with water, if desired) containing from approximately .04 to about .01 gram of the desired dye. This sensitized emulsion may then be coated upon a suitable support, such as glass cellulose derivative, paper or the like, to a suitable thickness and allowed to dry, the details of which are well known to photographic experts. Photographic elements so sensitized have properties different from ones heretofore produced with other sensitizing dyes and hence are of special utility.

The amount of dye which is actually incorporated in a given quantity of emulsion will, of course, vary from dye to dye and emulsion to emulsion, and the regulation and adoption of the most economical and useful proportions will be apparent to those skilled in the art upon observing the sensitizing power of the particular dye for the particular emulsion in question. The above proportions are, therefore, to be regarded only as illustrative and not to be understood as limiting the invention in any sense. Furthermore, it will be apparent that these dyes may be incorporated in the emulsion by other methods practiced by the art as, for instance, by bathing the plate or film upon which the emulsion has been coated, in a solution of the dye in an appropriate solvent, although this method of incorporating the dye in the emulsion is not to be preferred over that first described. Obviously, the claims are all intended to cover any combination of these dyes with a photographic emulsion whereby the dye exerts a sensitizing effect upon the emulsion.

Under the class of gelatino-silver-halide emulsions I, of course, include all of the silver halides customarily employed in the art, but more particularly the silver chloride and silver bromide emulsions. Under the term photographic emulsions I include, not only the gelatino-silver-halide emulsions, but such others as are known to those skilled in the art.

What I claim as my invention and desire to be secured by Letters Patent of the United States is:

1. A gelatino-silver-halide emulsion sensitized with a dye of the following structure

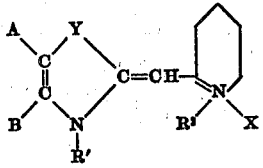

in which A and B represent a radical selected from the group consisting of hydrogen, alkyl and aryl radicals, Y represents an atom selected from the group consisting of oxygen, sulfur and selenium, R' and R² represent alkyl radicals and X represents an acid radical.

2. A gelatino-silver-halide emulsion sensitized with a dye of the following structure

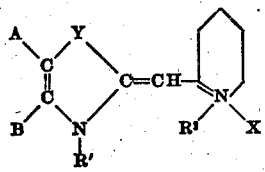

in which A and B represent a radical selected from the group consisting of hydrogen, alkyl and aryl radicals, Y represents an atom selected from the group consisting of oxygen, sulfur and selenium, R' and R² represent alkyl radicals and X represents a halide radical.

3. A gelatino-silver-halide emulsion sensitized with a dye of the following structure

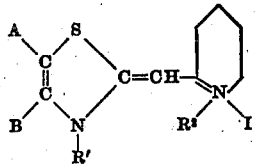

in which A and B represent a radical selected from the group consisting of hydrogen, alkyl and aryl radicals and R' and R² represent alkyl radicals.

4. A gelatino-silver-halide emulsion sensitized with a 3,1' - dialkylthiazolino - 2' - pyridocyanine salt.

5. A gelatino-silver-halide emulsion sensitized with a 3,1' - dialkylthiazolino - 2' - pyridocyanine halide.

6. A gelatino-silver-halide emulsion sensitized with a 3,1'-dimethylthiazolino-2' - pyridocyanine iodide.

LESLIE G. S. BROOKER.